United States Patent
Naiga et al.

(10) Patent No.: US 10,510,098 B2
(45) Date of Patent: *Dec. 17, 2019

(54) PROMOTION OF WEB SERVICES THROUGH AN IVR

(71) Applicant: Verizon Patent and Licensing Inc., Arlington, VA (US)

(72) Inventors: Kiran Naiga, Mountain View, CA (US); Momin Mirza, Santa Clara, CA (US); Gilda Majidi, San Jose, CA (US); Avinash S. Chugh, Nashua, NH (US); Manian Krishnamoorthy, Hyannis, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 771 days.

This patent is subject to a terminal disclaimer.

(21) Appl. No.: 14/926,679

(22) Filed: Oct. 29, 2015

(65) Prior Publication Data

US 2017/0124594 A1 May 4, 2017

(51) Int. Cl.
*G06Q 30/00* (2012.01)
*G06Q 30/02* (2012.01)
*H04M 3/51* (2006.01)

(52) U.S. Cl.
CPC ..... *G06Q 30/0267* (2013.01); *G06Q 30/0269* (2013.01); *H04M 3/5166* (2013.01)

(58) Field of Classification Search
CPC .......... G06Q 30/0267; G06Q 30/0269; H04M 3/4878; H04M 3/4936; H04M 3/5166
See application file for complete search history.

(56) References Cited

U.S. PATENT DOCUMENTS

| | | | |
|---|---|---|---|
| 6,282,515 B1* | 8/2001 | Speicher | G06Q 30/02 705/14.73 |
| 9,420,103 B1* | 8/2016 | Varman | H04W 4/12 |
| 9,767,473 B2* | 9/2017 | Dube | G06Q 30/0236 |
| 2002/0013728 A1 | 1/2002 | Wilkman | |
| 2004/0177376 A1 | 9/2004 | Caspi et al. | |
| 2005/0203835 A1 | 9/2005 | Nhaissi et al. | |
| 2008/0262911 A1* | 10/2008 | Altberg | G06Q 30/02 705/14.73 |
| 2009/0061764 A1* | 3/2009 | Lockhart | G06F 17/30017 455/3.06 |
| 2010/0173618 A1 | 7/2010 | Kass et al. | |
| 2011/0251892 A1* | 10/2011 | Laracey | G06Q 30/0253 705/14.51 |
| 2012/0130822 A1* | 5/2012 | Patwa | G06Q 30/0273 705/14.69 |
| 2012/0281820 A1* | 11/2012 | Hamerschlag | H04M 3/493 379/88.17 |
| 2016/0192108 A1* | 6/2016 | Chaudhary | H04W 4/003 455/411 |

* cited by examiner

*Primary Examiner* — Raquel Alvarez

(57) ABSTRACT

Targeted audio advertisements may be inserted into IVR sessions. The audio advertisements may be targeted based on session data that includes information describing an ongoing IVR session of a user of a mobile device and demographic information of the user. The audio advertisements may include prompts to solicit information from the user during the ongoing IVR session. The targeted audio advertisements may be played, to the user, during the ongoing IVR session.

20 Claims, 8 Drawing Sheets

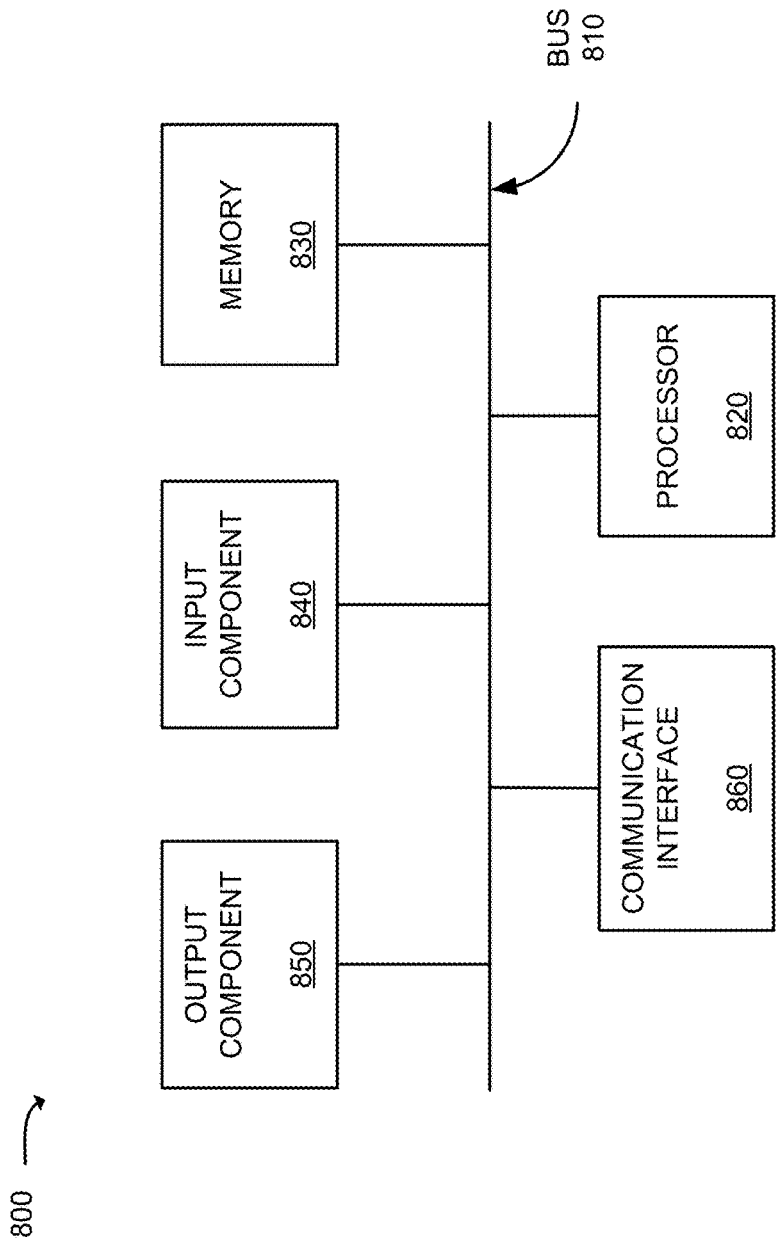

PROMOTION OF WEB SERVICES THROUGH AN IVR

BACKGROUND

Interactive voice response ("IVR") systems are computing systems that interact with humans through the use of voice, and potentially using other input, such as Dual Tone Multi-Frequency ("DTMF") tones. IVR systems are frequently used to allow customers to obtain information relating to the customers' accounts. IVR systems can provide the information using prerecorded or dynamically generated audio to direct customers on how to navigate the IVR menu. IVR systems may be particularly useful at reducing the need to hire large numbers of human support operators.

When interacting with an IVR system, a customer may experience quiet time (e.g., the customer may be put on hold) while the IVR system determines appropriate responses to the information entered by the user.

BRIEF DESCRIPTION OF THE DRAWINGS

FIG. 8 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein relate to methods and systems for inserting targeted audio advertisements into IVR sessions. Targeted audio advertisements may be inserted into periods of an IVR session that would otherwise be quiet or "on-hold" periods. The audio advertisements may be targeted, to each particular customer, based on customer specific information, the particular type of product or service that is supported by the IVR system, and/or based on current inputs that are received by the IVR system.

In some implementations, users may respond to an audio advertisement to indicate an interest in the advertisement. In response, actions may automatically be taken, with respect to the user's mobile device. For example, a particular mobile application ("app") may be automatically installed and, at the conclusion of the IVR session, launched. As another example, at the end of the IVR session, the user's mobile device may open a web browser and take the user to a particular webpage.

Figure 1:
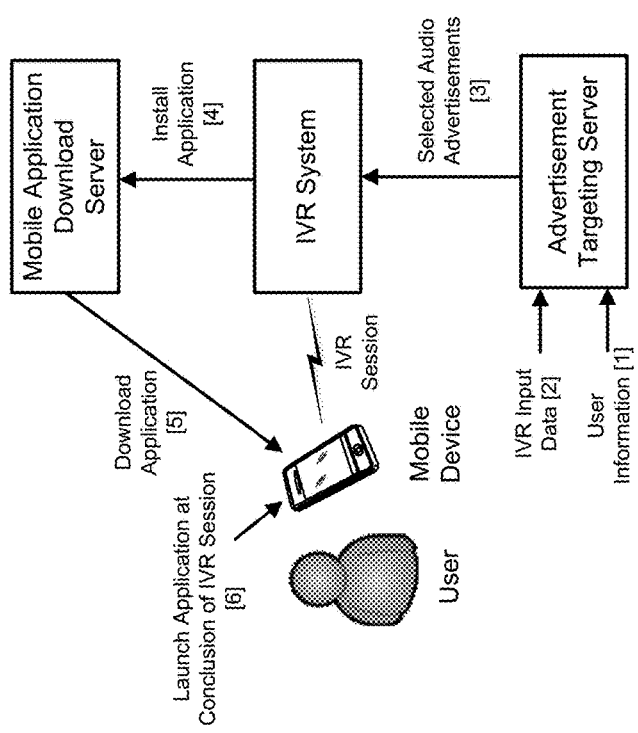
FIG. 1 is a diagram illustrating an example overview of implementations described herein.

FIG. 1 is a diagram illustrating an example overview of concepts described herein. As shown in FIG. 1, a user, using a mobile device, may initiate an IVR session with an IVR system. As is also shown in FIG. 1, in addition to the IVR system, an advertisement ("ad") targeting server and a mobile application download server may also be present. Particular audio advertisements that are relevant to the user may be selected by the advertisement targeting server and provided to the IVR system. The selection may be based on a number of different types of information, such as user profile or demographic information ("user information"), IVR input data (e.g., the choices made by the user during a particular IVR session, timing information describing how long it takes user to make the choices, data derived from the user's voice, or other information based on the current IVR session), or other information. In general, advertisement targeting server may operate to provide advertisements that are likely to be relevant to the user.

The mobile application download server may provide applications to the mobile device of the user. Mobile application download server may operate, in conjunction with a process implemented at the mobile device of the user, to, with the user's approval, install mobile applications without the friction that can be associated with conventional techniques that require a user to explicitly interact with an "app store" or other interface. Some audio advertisements may be associated with the installation of mobile device applications.

As an example of the operation of the system shown in FIG. 1, the user may call, with the user's mobile device, the IVR system to establish an IVR session. The advertisement targeting server may receive user information (at [1], "User Information"), such as demographic information of the user. Additionally, during the IVR session, the advertisement targeting server may receive information specific to the IVR session (at [2], "IVR Input Data"), such as IVR choices made by the user, the type (e.g., the industry) of the IVR system, or other information specific to the particular IVR session. In response, the advertisement targeting server may select audio advertisements for the user (at [3], "Selected Audio Advertisements"). The audio advertisements may be selected in real-time or near real-time, such that the audio advertisements may be provided during the ongoing IVR session.

As an example of an audio advertisement, consider an IVR system that is used to sell tickets, to sporting events, to users. A selected audio advertisement may be for an application or service that provides scores of sporting events. The audio advertisement may be played during an on-hold period of the IVR session (e.g., while ticket availability is being determined) and the user may be asked whether the user is interested in installing a mobile application. If the user consents to installation, the application may begin to be immediately downloaded, from the mobile application download server, to the mobile device of the user (e.g., in the background while the user continues to interact with an IVR session) (at [4], "Install Application," and [5], "Download Application"). At the conclusion of the IVR session, the application may be launched (at [6], "Launch Application at Conclusion of IVR Session"). For example, the application may open to display the score of the most recent match that was played by the team for which the user was interested in buying tickets. In this manner, interactive, relevant audio advertisements may be presented to a user, during an IVR session.

Figure 2:
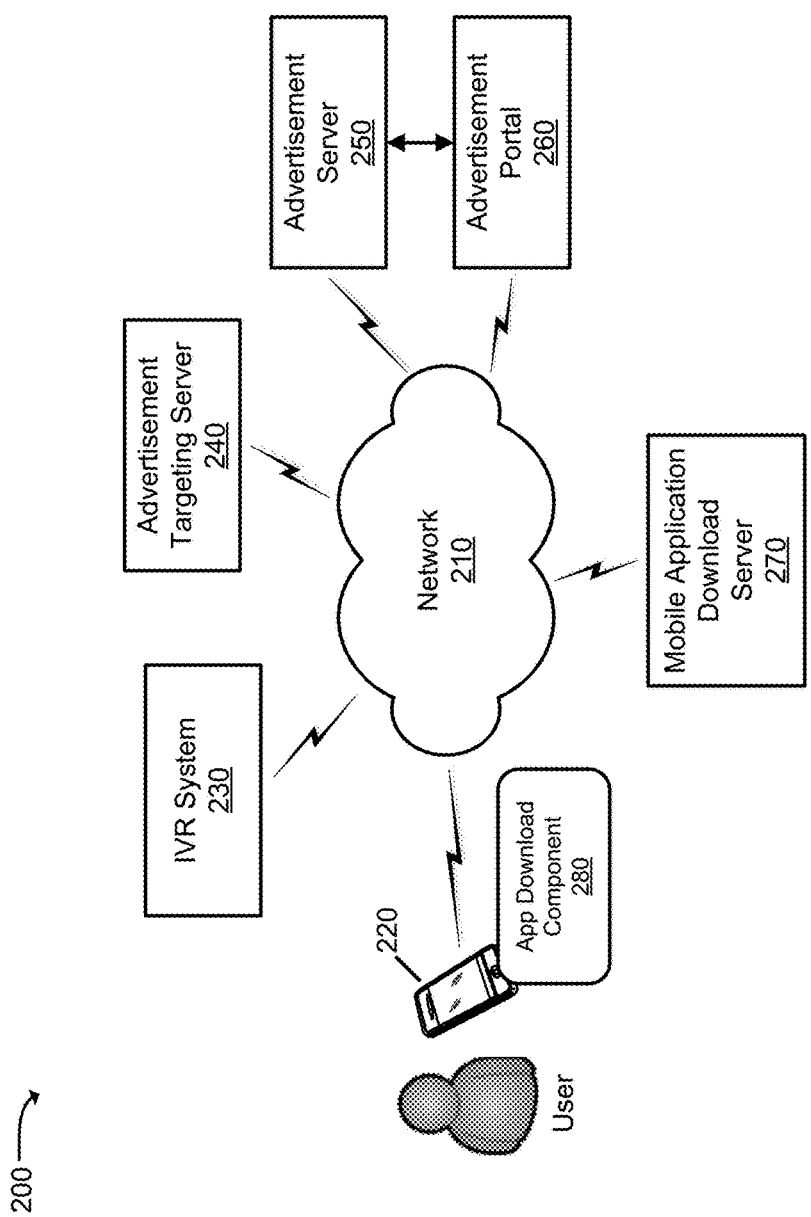
FIG. 2 is a diagram illustrating an example system in which techniques described herein may be implemented.

FIG. 2 is a diagram illustrating an example system 200 in which techniques described herein may be implemented. System 200 may include a network 210 that provides connectivity (e.g., via data and/or voice connections) to a number of user devices and server devices. As shown, network 210 may provide network connectivity to mobile devices 220, IVR system 230, advertisement targeting server 240, advertisement server 250, advertisement portal 260, and mobile application download server 270. Mobile device 220 may additionally be associated with a software component, labeled as application ("app") download component 280.

Network 210 may represent a wireless network (e.g., a wireless cellular network), and/or a wired network, through which mobile device 220, IVR system 230, servers 240, 250, 270, and advertisement portal 260 communicate. Network 210 may include a wide area network ("WAN"), a metropolitan area network ("MAN"), a radio access network ("RAN"), the Internet, a fiber optic-based network, and/or a combination of these or other types of networks. In one implementation, network 210 may include a wireless network that is implemented based on the Long Term Evolution ("LTE") standard. In other implementations, network 210 may include a wireless network implemented based on other standards, such as a Code Division Multiple Access ("CDMA") 2000 1× network, a second generation ("2G") wireless network, a third generation ("3G") wireless network, a fifth generation ("5G") wireless network, a "Wi-Fi" wireless network (e.g., a network that operates according to an Institute of Electrical and Electronics Engineers ("IEEE") 802.11 standard), and/or another wireless network. In some implementations, network 210 may be communicatively coupled to one or more other networks.

Mobile device 220 may include a portable computing and communication device, such as a personal digital assistant ("PDA"), a smart phone, a cellular phone, a laptop computer with connectivity to a cellular wireless network, a wearable device, a tablet computer, etc. In the context of an LTE cellular network, mobile device 220 may be referred to as User Equipment ("UE"). Mobile device 220 may wirelessly communicate with network 210. A user of mobile device 220 may, for example, place a telephone call to IVR system 230 to obtain automated assistance from the IVR system. Although a single mobile device 220 is shown to FIG. 2, mobile device 220 may represent a number of mobile devices and corresponding users.

IVR system 230 may represent one or more computing devices, databases, network elements, or other devices that are designed to interact with humans (e.g., the users of mobile devices 220), through the use of automated voice prompts (e.g., prerecorded or dynamically generated voice prompts), and potentially using other input, such as DTMF tones. In general, an organization, such as a company providing products or services, may design an IVR system 230 to support the particular products or services being offered by the company. IVR system 230 may, at certain points during an IVR session with a user, play audio advertisements to the user.

Advertising targeting server 240 may include one or more computing devices that select audio advertisements to play to particular users of IVR system 230. Ideally, advertising targeting server 240 will select audio advertisements that are relevant to the user to which the audio advertisements are played. The audio advertisement selections may be provided to IVR system 230. The operation of advertisement targeting server 240 will be described in more detail below.

Advertisement server 250 may include one or more computing devices that store and/or maintain audio advertisements that may be used by IVR system 230. Advertisement server 250 may provide audio advertisements to a number of different IVR systems, such as IVR systems that are implemented by a number of different companies or other entities. Advertisement portal 260 may include one or more computing devices that allow entities, such as companies or individuals, to create, upload, and/or manage audio advertisements. For example, advertisement portal 260 may provide a web interface through which advertisers can create and upload audio advertisements that are to be played in IVR systems. Advertisement portal 260 may be implemented as a separate system or as a system integrated within or as a part of advertisement server 250.

In some implementations, advertisement portal 260 may enable advertisers to control the amount that the advertiser is willing to spend on a particular advertisement campaign and/or the amount that the advertiser is willing to spend for each playback of an audio advertisement. Additionally, in some implementations, advertisers, when setting up advertisement campaigns, may be able to indicate the target demographics for the advertisement campaign, particular IVR systems to which the advertisement campaign is to be used, and other information that may allow the advertiser to target advertisements to particular set of users.

Mobile application download server 270 may include one or more computing devices that store applications (mobile applications) designed to be executed by mobile devices 220. Mobile application download server 270, in conjunction with app download component 280, may operate to download and install applications on mobile devices 220. In some implementations, initiation of the application installation may be performed by a command received from another server, such as from IVR system 230 or advertisement server 250. Alternatively or additionally, initiation of the application installation may be received in response to the communication from app download component 280. The applications, that are stored by mobile application download server 270, may be third-party applications, such as applications created by independent software developers, applications being promoted by advertisers that use advertisement server 250, or other 3rd parties that are not associated with the operator of network 210.

As is additionally shown in FIG. 2, mobile device 220 may be associated with application ("app") download component 280. Application download component 280 may include one or more processes, implemented by mobile device 220, that allow applications to be automatically downloaded and run, by mobile device 220, without requiring the user to navigate to an "app store" or other separate application installation/download site. Application download component 280 may, for example, be installed or managed by an operator of network 210 (e.g., the network provider through which the user obtains cellular network coverage). Application download component 280 may receive, during the course of an IVR session, control signals from IVR system 230, advertising targeting server 240, and/or advertisement server 250, that indicate that the particular application is to be downloaded (and potentially launched), from mobile application download server 270. In response, application download component 280 may begin to download and potentially install the application. In this manner, a mobile application may be installed while the user is engaged in an IVR session. At the conclusion of the IVR session, the application may be launched or otherwise brought to the attention of the user. Advantageously, mobile applications, with the consent of the user, may be downloaded and installed with relatively few operations by the user.

Although FIG. 2 illustrates example components of system 200, in other implementations, system 200 may contain fewer components, different components, differently arranged components, or additional components than those depicted in FIG. 2. Alternatively, or additionally, one or more components of system 200 may perform one or more other tasks described as being performed by one or more other components of system 200. For example, although IVR system 230, advertisement targeting server 240, advertisement server 250, advertisement portal 260, and mobile application download server 270, are illustrated as separate components, the functionality of these components may be combined and included within a single device (e.g., the functionality associated with advertisement targeting server 240, advertisement server 250, and advertisement portal 260, may be provided by a single computing server). Additionally, the term "server," as used herein, may refer to one or more computing devices, which may be geographically co-located or distributed.

Figure 3:
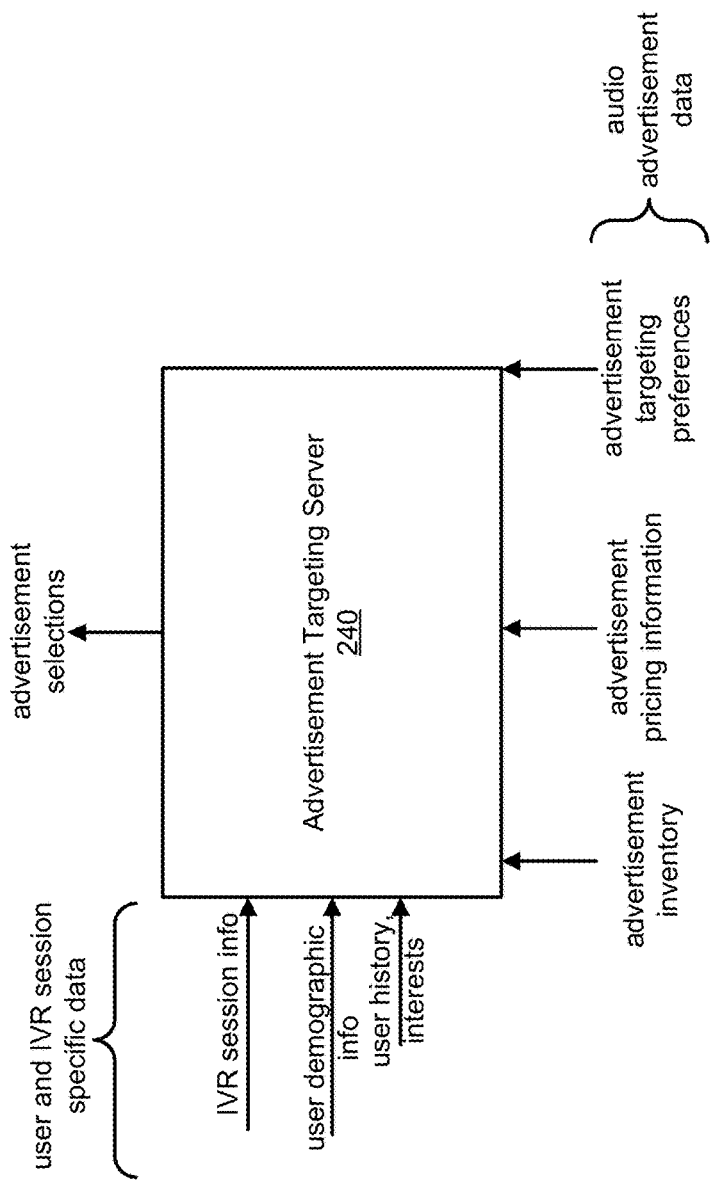
FIG. 3 is a diagram illustrating an example of the operation of an advertisement targeting server.

FIG. 3 is a diagram illustrating an example of the operation of advertisement targeting server 240. As previously mentioned, advertisement targeting server 240 may operate to select audio advertisements, that are relevant to particular users and IVR sessions, for presenting to the users during the IVR session.

Advertisement targeting server 240 may determine a relevant audio advertisement based on user and IVR session specific data. For example, as shown, advertisement targeting server 240 may receive (1) IVR session information ("info"), (2) user demographic information, and/or (3) user history and interests. The IVR session information may include data, received from IVR system 230, that is specific to a particular user session with the IVR system. For example, the IVR session information may include a type, industry or category of the IVR system (e.g., whether the IVR system is an automated system to support users of a wireless telecommunications network, users that have purchased consumer kitchen appliances, customers of a computer game publishing company, etc.), or a product or service for which the user has contacted the IVR system. Additionally, the IVR session information may include more specific information relating to a location or context of the current IVR session of the user with IVR system 230. For example, the IVR session information may indicate that the user is at a particular prompt in the IVR session (e.g., the user has recently indicated that the user is interested in sporting tickets for a particular sports team or the user has recently indicated that the user is interested in traveling to a particular city or state, etc.).

The IVR session information can also potentially include more detailed information relating to the mechanics of the user's interaction with IVR system 230. For example, the user speed of selecting IVR options may be included in the IVR session information. Fast user selection speed when navigating a dynamically created IVR menu may be used as an indication of, for example, highly tuned reflexes that may indicate that the user may prefer mobile games that require quick responses. Fast user selection speed when navigating a statically created IVR menu may be taken as an indication of a strong user memory which may indicate that the user may be more interested in memory challenging mobile games. As another example, the user's choice and/or mix of using voice commands relative to touchtone commands may be used as a factor in selecting relevant advertisements (e.g., whether the user interacts, in the IVR session, using voice commands or touchtone (e.g., DTMF keypad) input). As another example, the user's choice and/or mix of using voice commands relative to app-based interaction (when available) may be used as a factor in selecting relevant advertisements. As another example, when making voice-based IVR selections, the user's tone of voice, volume of voice, regional accent, intensity of breathing, length of intervals between speaking, and/or level of distraction may be used as factors in selecting relevant advertisements. As another example, data gathered from background noise (e.g., audible sounds of other people, environmental sounds, animal sounds, or other sounds) may be used as factors in selecting relevant advertisements.

In some implementations, additional sensor data, that may be available for mobile device 220, such as accelerometer data, gyroscope data, GPS data, may be transmitted, by app download component 280, to advertisement targeting server 240, and used as factors in selecting relevant advertisements. Additional sensor data, as well as any other data used by advertisement targeting server 240, may only be gathered when appropriate user permissions have been obtained.

The user demographic information may include demographic information such as, for example, the age of the user, the residence location of the user, the sex of the user, etc. The demographic information may be obtained, for example, from subscriber databases associated with network 210 and may be based on the MDN of mobile device 220. Alternatively or additionally, the demographic information may be provided by IVR system 230. The user history and interests may relate to other information that is known about the user. For example, the user may have provided an indication of the interests of the user to the operator of network 210. As another example, with appropriate user permissions and privacy considerations, the operator of network 210 may track websites visited by the user or otherwise infer the interests of the user. This information may be used as additional factors in selecting audio advertisements relevant to the user.

Advertisement targeting server 240 may match the user and IVR session specific data to audio advertisement data. As illustrated in FIG. 3, the audio advertisement data may include: (1) an audio advertisement inventory, (2) advertisement pricing information, and (3) advertisement targeting preferences. The audio advertisement inventory may represent the set of advertisements that are associated with advertisers. As previously mentioned, in some implementations, the audio advertisements may be advertisements that are created by the advertisers and uploaded to advertisement server 250, via advertisement portal 260. Application programming interfaces (APIs) or other tools may be provided to the advertisers to allow the advertisers to create advertisements that conform to the specifications required by IVR system 230.

Advertisement pricing information may include information describing the prices associated with various audio advertisements. For example, advertisers may bid for advertisement space by specifying particular amounts they are willing to pay to play the audio advertisements at the IVR systems. Advertisement targeting server 240, when selecting advertisements to play, may take into account the advertisement pricing information (e.g., an advertisement may not be played if doing so would place a particular advertiser over the specified budget).

Advertisement targeting preferences may include information specifying particular user demographic information, or other information, relating to the preferred target audience of the audio advertisements. For example, an advertiser promoting an arcade style mobile game may target the advertisement to a younger audience while an advertiser promoting an electronic non-fiction history book may choose to target a relatively older audience.

Based on the user and IVR session specific data, and the audio advertisement data, advertisement targeting server 240 may generate advertisement selections that may identify recommended audio advertisements for playback by IVR system 230. As previously mentioned, the advertisement selections may be made in real-time with respect to IVR sessions that are ongoing at IVR system 230. That is, IVR session information about an ongoing IVR session may be used to generate advertisement selections that are to be played during the same IVR session.

A number of techniques may be used to select appropriate advertisements from the advertisement inventory. For example, supervised or unsupervised machine learning techniques may be used by advertisement targeting server 240 to select advertisements that are relevant to the user. The machine learning techniques may include regression-based machine learning, classification-based machine learning, or clustering-based machine learning. Alternatively or additionally, neural networks, genetic algorithms, pattern matching techniques, or other modeling techniques may be used to optimally select relevant advertisements.

Figure 4:
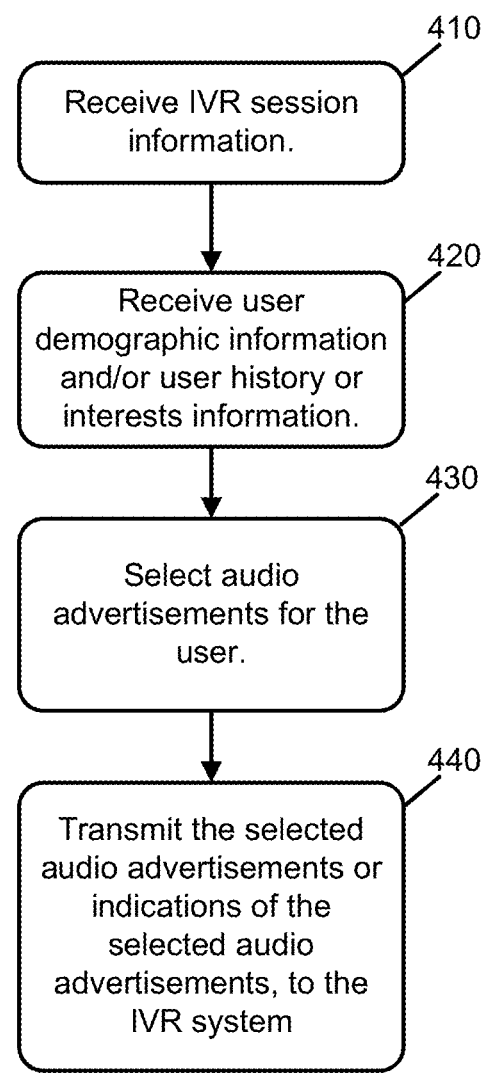
FIG. 4 is a flowchart of an example process for selecting audio advertisements to provide during IVR sessions.

FIG. 4 is a flowchart of an example process 400 for selecting audio advertisements to provide during IVR sessions. Process 400 may be performed by, for example, advertisement targeting server 240.

Process 400 may include receiving IVR session information (block 410). The IVR session information may relate to a particular IVR session, of a user, with IVR system 230. As previously mentioned, the IVR session information may include detailed information relating to the mechanics of the user's interaction with IVR system 230, information about the IVR system with which the user is interacting, or other information that is provided to advertisement targeting server 240 during the course of the IVR session of the user. The IVR session information may be transmitted, by the IVR system 230, to advertisement targeting server 240.

Process 400 may further include receiving user demographic information and/or user history or interests information (at 420). As mentioned, the demographic information can include demographic information about the particular user. The user history or interests information may relate to other information that is known about the user (e.g., hobbies of a user, recent purchases of the user, or other information). The demographic information and user history/interest information may be obtained, for example, from subscriber databases associated with network 210.

Process 400 may further include selecting audio advertisements for the user (block 430). As previously mentioned, advertisement targeting server 240 may select one or more audio advertisements, for a particular user, based on the user specific data, IVR session information, and the audio advertisement data. The selected audio advertisements may include audio prompts via which a user may choose to download an application, open a previously installed application at a particular state, or perform some other action (e.g., navigate to a particular webpage). In some implementations, the action that is performed (or application that is launched) may be scheduled to occur at the conclusion of the IVR session.

Process 400 may further include transmitting the selected audio advertisements or indications of the selected audio advertisements, for a particular user, to the IVR system (block 440). IVR system 230, at appropriate places in the IVR session, may play the audio advertisement to the user.

Figure 5:
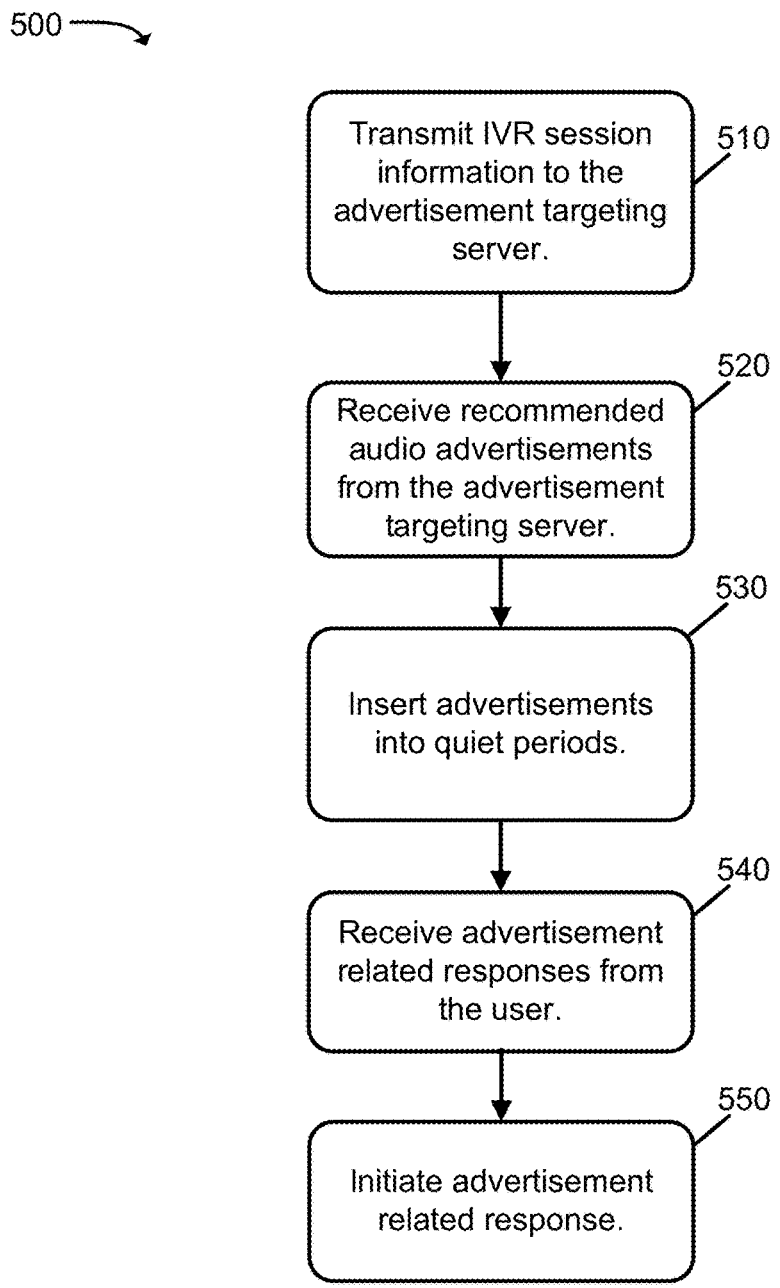
FIG. 5 is a flowchart of an example process for providing audio advertisements, to users, during IVR sessions.

FIG. 5 is a flowchart of an example process 500 for providing audio advertisements, to users, during IVR sessions. Process 500 may be performed by, for example, IVR system 230.

Process 500 may be implemented for each user IVR session with IVR system 230. To begin, process 500 may include transmitting IVR session information to the advertisement targeting server (block 510). A user, of mobile device 220, may call IVR system 230 to begin an IVR session. In one implementation, process 500 may only be implemented for "smart" mobile devices, such as mobile devices that are capable of downloading and installing mobile applications (e.g., smart phones). IVR system 230 may determine whether a particular mobile device 220 is appropriate to serve audio advertisements in a manner described herein based on the telephone number of the caller device. For example, IVR system 230 may query a database associated with network 210, advertisement targeting server 240, or another device, to determine whether mobile device 220 is a valid device for the servicing of audio advertisements in the manner described herein.

As previously mentioned, the IVR session information may relate to a particular IVR session, of a user, with IVR system 230. The IVR session information may include detailed information relating to the mechanics of the user's interaction with IVR system 230, information about the IVR system with which the user is interacting, or other information that is provided to advertisement targeting server 240 during the course of the IVR session of the user. The IVR session information may be transmitted, by IVR system 230, to advertisement targeting server 240. The MDN associated with the user may be used to identify the user to advertisement targeting server 240.

Process 500 may further include receiving recommended audio advertisements from the advertisement targeting server (block 520). The recommended audio advertisements may include a set of one or more advertisements that advertisement targeting server 240 has determined to be potentially relevant to the user and/or the current IVR session.

Process 500 may further include inserting the recommended advertisements into quiet periods of the IVR session (block 530). For example, IVR system 230 may insert an advertisement into the IVR session when IVR system 230 is performing a database query or is waiting for a user response. Alternatively or additionally, IVR system 230 may insert the advertisement at another point during the IVR session. The advertisement may be obtained from advertisement server 250 and/or may be stored locally by IVR system 230.

The advertisements may include an audible query or prompt, for the user. The user may respond to the query via a verbal response or in another manner, such as via the touchpad (e.g., DTMF signals). Thus, IVR system 230 may receive advertisement related responses from the user (block 540). For example, the user may indicate a desire to download and install a mobile application from mobile application download server 270, navigate to a particular webpage at the conclusion of the IVR session, or open a previously installed mobile application at the conclusion of the IVR session.

Process 500 may include initiating an action corresponding to the received response (block 550). For example, when the user indicates, in response to an audio advertisement that asks the user if he wishes to install a particular mobile application, a desire to install the particular mobile application, IVR system 230 may signal app download component 280, at mobile device 220, to install the particular mobile application. In some implementations, instead of directly communicating with app download component 280, IVR system 230 may request that another network element, such as advertisement server 250, control app download component 280 to perform the indicated action. This may be desirable to ensure that only authorized network devices are allowed to control app download component 280.

Figure 6:
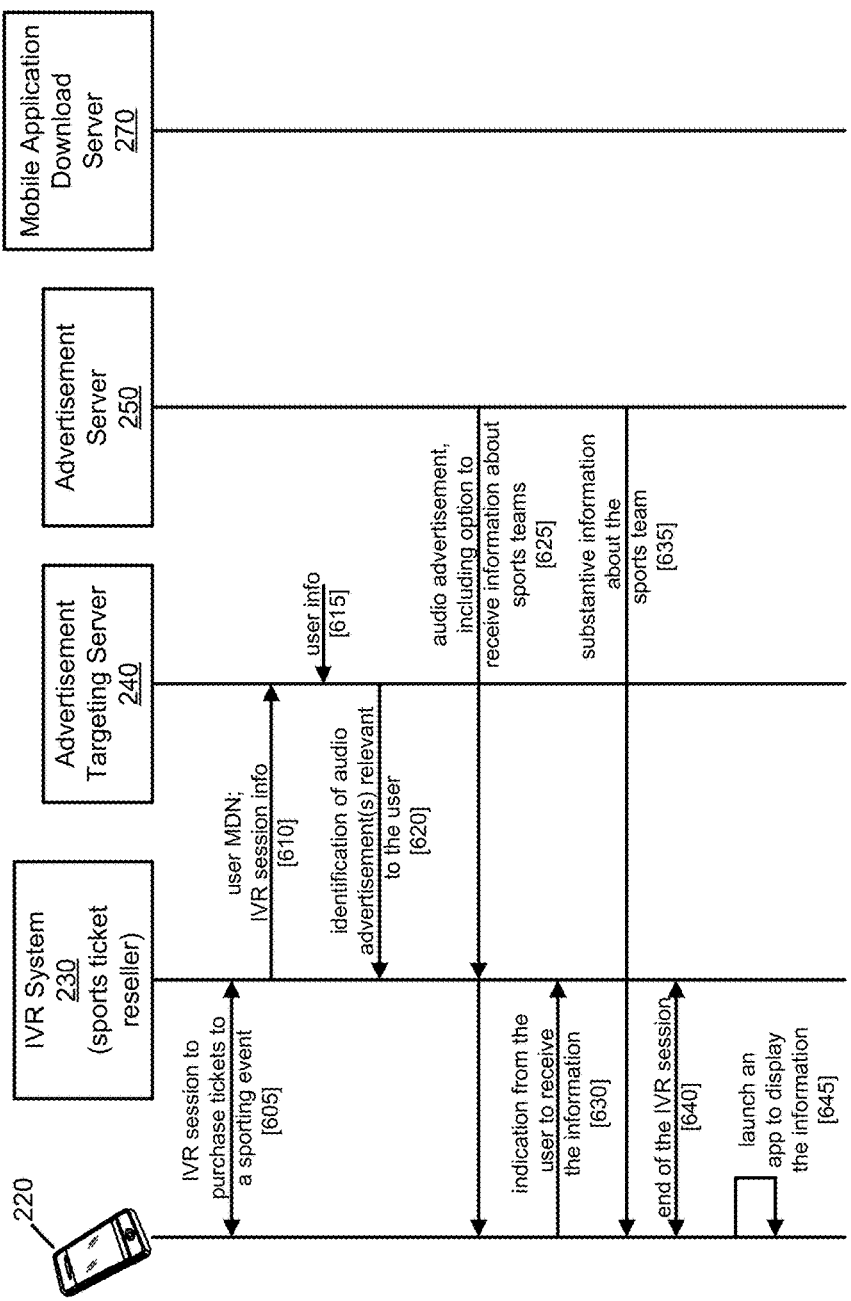
FIG. 6 is a diagram illustrating a process flow corresponding to one example use case consistent with aspects described herein.

FIG. 6 is a diagram illustrating a process flow corresponding to one example use case consistent with aspects described herein. In FIG. 6, assume that a user of mobile device 220 wishes to purchase tickets to a sporting event. In this case, IVR system 230 may be managed by a reseller of tickets to sporting events.

The user may begin by initiating the IVR session to purchase tickets to the sporting event (at 605, "IVR session to purchase tickets to a sporting event"). That is, the user may call the telephone number of IVR system 230 using mobile device 220 of the user.

During the course of the IVR session, IVR system 230 may provide IVR session information to advertisement targeting server 240 (at 610, "user MDN, IVR session information"). The IVR session information may include, for example, the sports teams for which the user is interested in purchasing tickets. IVR system 230 may also provide identification information for the user, such as the user's MDN. The MDN may allow advertisement targeting server 240 to obtain, for the network devices, user information (at 615, "user info"). The user information may include demographic information, user preference information, or other information about the user.

Advertisement targeting server 240 may, based on the IVR session information and the user information, identify one or more audio advertisements that are relevant to the user (at 620, "identification of audio advertisements relevant to the user"). As an example, advertisement targeting server 240 may perform a correlation analysis to programmatically identify audio advertisements that may be relevant to the user. The correlation analysis may take into account the context of mobile device 220, the fact that sporting applications that have installed mobile device 220 tend to have a high engagement rates, and the engagement rate of sports-related advertisements when presented via the IVR system of the sports ticket reseller.

IVR system 230 may present the identified audio advertisement(s) to the user. In this example, assume that the audio advertisement includes an option to receive information about sports teams. For example, advertisement targeting server 240 may determine that mobile device 220 previously installed a mobile application designed to provide sports related information (e.g., sports scores) to the user. In this case, the audio advertisement may be a reminder that the particular mobile application is installed at mobile device 220 and that the application can be used to provide additional information, to the user, at the conclusion of the IVR session (at 625, "audio advertisement, including option to receive information about sports teams"). For example, the audio played back to the user may be: "Do you wish to receive additional information about your team? If so, we recommend using an app that is already installed on your device. Say 'more information' to open the app at the conclusion of this session."

The user may respond to the audio advertisement. In this example, assume that the user indicates that the user would like to receive additional information about the team in which the user is interested (at 630, "indication from the user to receive the information"). Advertisement server 250, or another device associated with network 210, may transmit the information to mobile device 220 (at 635, "substantive information about the sports team"). App download component 280 may receive the information and may associate the received information with the previously installed mobile application. At the end of the IVR session (at 640, "end of the IVR session"), app download component 280 may launch (at 645, "launch an app to display the information") the previously installed mobile application and the information received from advertisement server 250 may be provided to the previously installed mobile application as state data for the application. For example, if the previously installed mobile application is an application that displays sports scores, the context data may indicate the sport team or game in which the user is interested (i.e., the team for which the user bought tickets via the IVR session).

Figure 7:
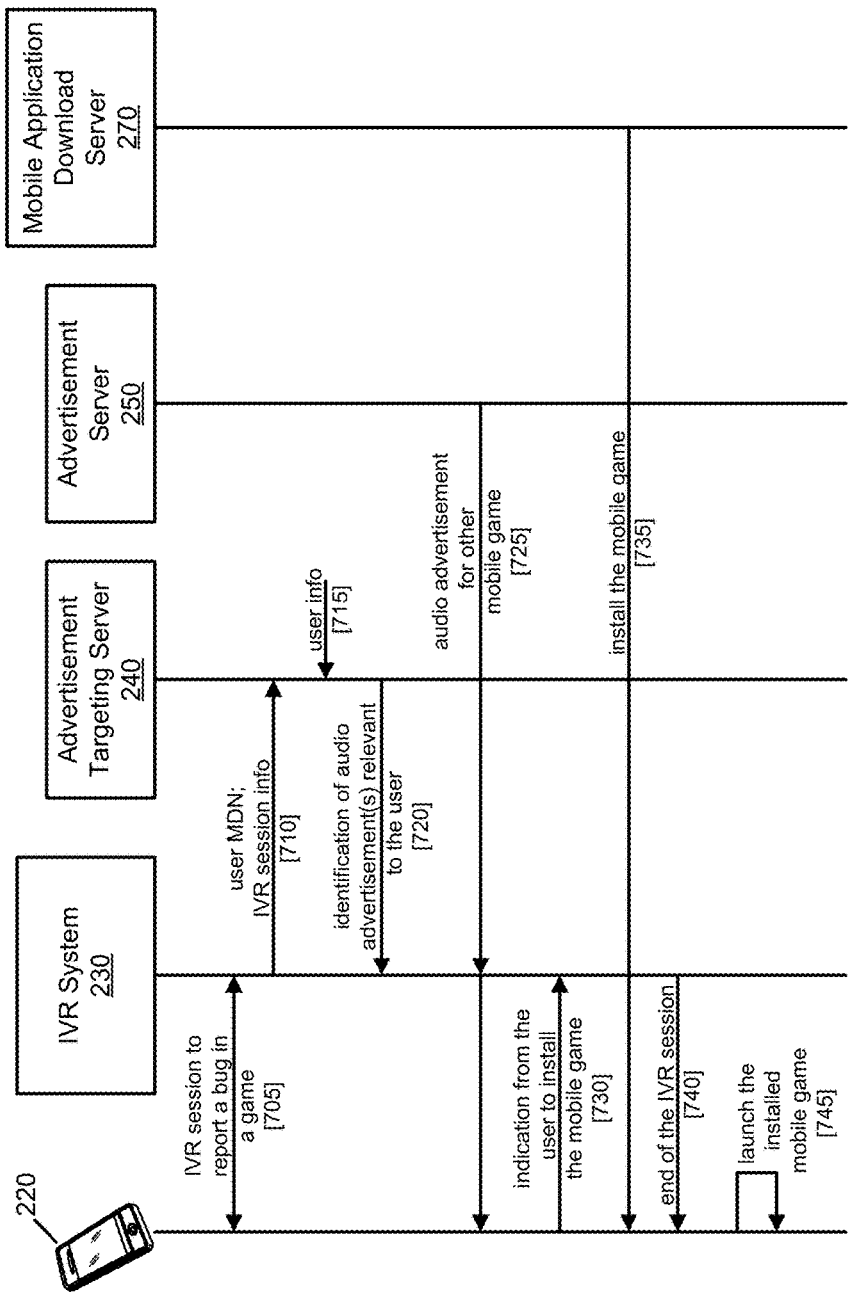
FIG. 7 is a diagram illustrating a process flow corresponding to another example use case consistent with aspects described herein.

FIG. 7 is a diagram illustrating a process flow corresponding to another example use case consistent with aspects described herein. In FIG. 7, assume that a user of mobile device 220 calls IVR system 230 to report a software issue with a mobile game that the user has installed at mobile device 220.

The user may begin by initiating the IVR session to report the software issue (at 705, "IVR session to report a bug in a game"). That is, the user may call the telephone number of IVR system 230 using mobile device 220 of the user.

During the course of the IVR session, IVR system 230 may provide IVR session information to advertisement targeting server 240 (at 710, "user MDN, IVR session information"). The IVR session information may include, for example, the fact that the user is reporting a software issue and the specific game for which the software issue is being reported. IVR system 230 may also provide identification information for the user, such as the user's MDN. The MDN may allow advertisement targeting server 240 to obtain, for the network devices, user information (at 715, "user info"). The user information may include demographic information or other information about the user.

Advertisement targeting server 240 may, based on the IVR session information and the user information, identify one or more audio advertisements that are relevant to the user (at 720, "identification of audio advertisements relevant to the user"). As an example, advertisement targeting server 240 may programmatically identify advertisements about games similar to the game for which the user is calling the IVR system. Advertisement targeting server 240 may identify the advertisements based on, for example, the type of mobile device 220 that is being used (e.g., to only identify games that are compatible with mobile device 220), the game that the user is calling about, website browsing history of the user, the user's age, and the user's sex.

IVR system 230 may present the identified audio advertisement(s) to the user. In this example, assume that the audio advertisement includes an option to download and install a game. In this case, the audio advertisement may provide a description of the game and an option to install the game (at 725, "audio advertisement for other mobile game"). For example, the audio played back to the user may be: "War of Clans is a highly rated and fun empire building game. Do you wish to try it? Say 'yes' to install the game." The advertisement may be played, for example, while the user waits for help from a human operator.

The user may respond to the audio advertisement. In this example, assume that the user indicates (e.g., by saying "yes") that the user would like to install the advertise game (at 730, "indication from the user to install the mobile game"). Mobile device 220 may install the mobile game (at 735, "install the mobile game"). For example, app download component 280 may, in response to a command from IVR system 230, advertisement server 250, or another device, may install the mobile game from mobile application download server 270. At the end of the IVR session (at 740, "end of the IVR session"), app download component 280 may launch the installed mobile game (at 745, "launch the installed mobile game").

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or other processing components that may interpret and execute instructions. Memory 830 may include any type of dynamic storage device that may store information and instructions for execution by processor 820, and/or any type of non-volatile storage device that may store information for use by processor 820. Processor 820 and memory 830 may collectively perform processes by interpreting and executing instructions and may be referred to as "logic" herein.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

When device 800 represents a small cell, communication interface 860 may include one or more radio transceivers to transmit and receive data. Communication interface 860 may additionally include a passive "sniffing" receiver to measure received signal strength.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 4-7, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. One or more computing devices, including:
a non-transitory computer-readable medium storing a set of processor-executable instructions; and
one or more processors configured to execute the processor-executable instructions, wherein executing the processor-executable instructions causes the one or more processors to:
receive Interactive Voice Response (IVR) session data that includes information describing an ongoing IVR session of a user of a mobile device;
receive demographic information of the user;
determine, based on the IVR session data and the demographic information, an audio advertisement that is associated with a particular application, the audio advertisement including a prompt that asks permission, from the user, to install the particular mobile application during the ongoing IVR session;
cause the determined audio advertisement to be played, to the user, during the ongoing IVR session;
receive, in response to the prompt, permission to install the particular application; and
provide, based on receiving the permission to install the particular application, the particular application to the user device, wherein providing the particular application to the user device causes the user device to:
install the particular application during the IVR session,
determine, after installing the particular application, that the IVR session has ended, and
automatically launch the installed particular application based on determining that the IVR session has ended.

2. The one or more computing devices of claim 1, wherein the IVR session data further includes one or more of:
a product or service for which the user has contacted an IVR system to establish the IVR session;
an indication of an industry or category of the IVR system; or
an indication of a particular prompt or menu selection that is currently being provided to the user by the IVR system.

3. The one or more computing devices of claim 1, wherein the IVR session data further includes one or more of:
an indication of a selection speed at which the user selects prompts in the IVR session; or
an indication of whether the user interacts, in the IVR session, using voice commands or touchtone input.

4. The one or more computing devices of claim 1, wherein executing the processor-executable instructions further causes the one or more processors to:
receive history or interest data relating to the user, wherein the determination of the audio advertisement is further based on the received history or interest data.

5. The one or more computing devices of claim 1, wherein executing the processor-executable instructions further causes the one or more processors to:
receive sensor data, as determined by an accelerometer of the mobile device of the user, wherein the determination of the audio advertisement is further based on the received sensor data.

6. The one or more computing devices of claim 1, wherein the determination of the audio advertisement is based on a machine learning technique that is based on refining determinations of audio advertisements for one or more users, the refining being based on at least:
the IVR session data, and
the demographic information.

7. The one or more computing devices of claim 6, wherein the machine learning technique includes at least one of:
regression-based machine learning,
classification-based machine learning, or
clustering-based machine learning.

8. A method, implemented by one or more devices, comprising:
receiving, by the one or more devices, Interactive Voice Response (IVR) session data that includes information describing an ongoing IVR session of a user of a mobile device;
receiving, by the one or more devices, demographic information of the user;
determining, by the one or more devices, and based on the IVR session data and the demographic information, an audio advertisement that is associated with a particular application, the audio advertisement including a prompt that asks permission, from the user, to install the particular mobile application during the ongoing IVR session;
causing, by the one or more devices, the determined audio advertisement to be played, to the user, during the ongoing IVR session;
receiving, in response to the prompt, permission to install the particular application; and
providing, based on receiving the permission to install the particular application, the particular application to the user device, wherein providing the particular application to the user device causes the user device to:
install the particular application during the IVR session,
determine, after installing the particular application, that the IVR session has ended, and
automatically launch the installed particular application based on determining that the IVR session has ended.

9. The method of claim 8, wherein the IVR session data further includes one or more of:
a product or service for which the user has contacted an IVR system to establish the IVR session;
an indication of an industry or category of the IVR system; or
an indication of a particular prompt or menu selection that is currently being provided to the user by the IVR system.

10. The method of claim 8, wherein the IVR session data further includes one or more of:

an indication of a selection speed at which the user selects prompts in the IVR session; or an indication of whether the user interacts, in the IVR session, using voice commands or touchtone input.

11. The method of claim 8, further including:

receiving history or interest data relating to the user, wherein the determination of the audio advertisement is further based on the received history or interest data.

12. The method of claim 8, further including:

receiving accelerometer data measured by an accelerometer of the mobile device of the user, wherein the determination of the audio advertisement is further based on the received accelerometer data.

13. The method of claim 8, wherein the determination of the audio advertisement is based on a machine learning technique that is based on refining determinations of audio advertisements for one or more users, the refining being based on at least:

the IVR session data, and the demographic information.

14. A non-transitory computer-readable medium, storing a set of processor-executable instructions, wherein execution of the processor-executable instructions causes one or more processors to:

receive Interactive Voice Response (IVR) session data that includes information describing an ongoing IVR session of a user of a mobile device;

receive demographic information of the user;

determine, based on the IVR session data and the demographic information, an audio advertisement that is associated with a particular application, the audio advertisement including a prompt that asks permission, from the user, to install the particular mobile application during the ongoing IVR session;

cause the determined audio advertisement to be played, to the user, during the ongoing IVR session;

receive, in response to the prompt, permission to install the particular application; and provide, based on receiving the permission to install the particular application, the particular application to the user device, wherein providing the particular application to the user device causes the user device to:

install the particular application during the IVR session, determine, after installing the particular application, that the IVR session has ended, and automatically launch the installed particular application based on determining that the IVR session has ended.

15. The non-transitory computer-readable medium of claim 14, wherein the IVR session data further includes one or more of:

a product or service for which the user has contacted an IVR system to establish the IVR session;

an indication of an industry or category of the IVR system; or an indication of a particular prompt or menu selection that is currently being provided to the user by the IVR system.

16. The non-transitory computer-readable medium of claim 14, wherein the IVR session data further includes one or more of:

an indication of a selection speed at which the user selects prompts in the IVR session; or an indication of whether the user interacts, in the IVR session, using voice commands or touchtone input.

17. The non-transitory computer-readable medium of claim 14, wherein execution of the processor-executable instructions further causes the one or more processors to:

receive history or interest data relating to the user, wherein the determination of the audio advertisement is further based on the received history or interest data.

18. The non-transitory computer-readable medium of claim 14, wherein execution of the processor-executable instructions further causes the one or more processors to:

receive sensor data, as determined by an accelerometer of the mobile device of the user, wherein the determination of the audio advertisement is further based on the received sensor data.

19. The non-transitory computer-readable medium of claim 14, wherein the determination of the audio advertisement is based on a machine learning technique that is based on refining determinations of audio advertisements for one or more users, the refining being based on at least:

the IVR session data, and the demographic information.

20. The non-transitory computer-readable medium of claim 19, wherein the machine learning technique includes at least one of:

regression-based machine learning, classification-based machine learning, or clustering-based machine learning.

* * * * *